(12) United States Patent
Park

(10) Patent No.: US 11,458,465 B2
(45) Date of Patent: Oct. 4, 2022

(54) LOW-TEMPERATURE DENO$_x$ CATALYST FOR SELECTIVE CATALYTIC REDUCTION HAVING IMPROVED SULFUR RESISTANCE, AND METHOD OF MANUFACTURING SAME

(71) Applicant: Hanseo University Academic Cooperation Foundation, Seosan-si (KR)

(72) Inventor: Hea Kyung Park, Seoul (KR)

(73) Assignee: HANSEO UNIVERSITY ACADEMIC COOPERATION FOUNDATION, Seosan-si (KR)

( * ) Notice: Subject to any disclaimer, the term of this patent is extended or adjusted under 35 U.S.C. 154(b) by 65 days.

(21) Appl. No.: 16/950,799

(22) Filed: Nov. 17, 2020

(65) Prior Publication Data
US 2021/0187490 A1    Jun. 24, 2021

(30) Foreign Application Priority Data

Dec. 19, 2019   (KR) .......................... 10-2019-0170834

(51) Int. Cl.
| | |
|---|---|
| *B01J 23/31* | (2006.01) |
| *B01J 23/10* | (2006.01) |
| *B01J 37/03* | (2006.01) |
| *B01J 6/00* | (2006.01) |
| *B01J 23/18* | (2006.01) |
| *B01J 23/22* | (2006.01) |
| *B01J 37/04* | (2006.01) |
| *B01J 37/08* | (2006.01) |
| *B01J 37/34* | (2006.01) |
| *F01N 3/20* | (2006.01) |
| *B01J 21/06* | (2006.01) |

(52) U.S. Cl.
CPC ............. *B01J 37/031* (2013.01); *B01J 6/001* (2013.01); *B01J 23/10* (2013.01); *B01J 23/18* (2013.01); *B01J 23/22* (2013.01); *B01J 23/31* (2013.01); *B01J 37/04* (2013.01); *B01J 37/08* (2013.01); *B01J 37/343* (2013.01); *F01N 3/2066* (2013.01); *B01J 21/063* (2013.01); *F01N 2570/14* (2013.01)

(58) Field of Classification Search
None
See application file for complete search history.

(56) References Cited

U.S. PATENT DOCUMENTS 5,380,692 A * 1/1995 Nakatsuji ............... B01J 23/002
502/313

FOREIGN PATENT DOCUMENTS

| CN | 108201888 | * | 12/2016 |
|---|---|---|---|
| KR | 101113380 B1 | | 3/2012 |
| KR | 20150129852 A | | 11/2015 |

* cited by examiner

*Primary Examiner* — Sheng H Davis
(74) *Attorney, Agent, or Firm* — STIP Law Group, LLC

(57) ABSTRACT

Proposed are a low-temperature DeNOx catalyst for selective catalytic reduction having improved sulfur resistance and a method of manufacturing the same. The low-temperature DeNOx catalyst for selective catalytic reduction having improved sulfur resistance accelerates the reduction reaction of nitrogen oxides even at low temperatures despite the small amount of vanadium supported, improves sulfur poisoning resistance, does not cause secondary environmental pollution by treated gas, has excellent abrasion resistance and strength and thus the removal efficiency of nitrogen oxides is not reduced even during long-term operation, and is easy to manufacture, thus contributing to commercialization.

8 Claims, No Drawings

LOW-TEMPERATURE DENO$_x$ CATALYST FOR SELECTIVE CATALYTIC REDUCTION HAVING IMPROVED SULFUR RESISTANCE, AND METHOD OF MANUFACTURING SAME

CROSS REFERENCE TO RELATED APPLICATION

The present application claims priority based on Korean Patent Application No. 10-2019-0170834, filed on Dec. 19, 2019, the entire content of which is incorporated herein for all purposes by this reference.

BACKGROUND OF THE DISCLOSURE

1. Field of the Disclosure

The present disclosure relates to a low-temperature DeNOx catalyst for selective catalytic reduction having improved sulfur resistance, and to a method of manufacturing the same. More particularly, the present disclosure relates to a low-temperature DeNOx catalyst for selective catalytic reduction, which is capable of efficiently decomposing and removing nitrogen oxides in exhaust gas including sulfur oxides at low operating temperatures, and to a method of manufacturing the same.

2. Description of the Related Art

Among the exhaust gases emitted from stationary sources such as chemical plants, power plants, boilers, and waste incineration plants, and from mobile sources such as automobiles and ships, nitrogen oxides (NO$_X$) are well known together with sulfur oxides (SO$_X$), dust, dioxins, heavy metals, and volatile organic compounds as materials that cause environmental pollution.

Nitrogen oxides (NO$_X$) are mainly generated through the reaction of nitrogen and oxygen in the presence of excess air in a high-temperature combustion facility, and are classified into nitrogen monoxide (NO), nitrogen dioxide (NO$_2$), dinitrogen monoxide (N$_2$O), dinitrogen trioxide (N$_2$O$_3$), dinitrogen tetraoxide (N$_2$O$_4$), and dinitrogen pentoxide (N$_2$O$_5$). Among them, nitrogen monoxide is a carcinogenic substance that is very harmful to the human body, and is also a pollutant that causes serious air pollution and generates acid rain and smog along with sulfur oxides, thus destroying the global environment. Accordingly, in order to suppress the generation of nitrogen monoxide, efforts are being made to develop technologies for suppressing the generation thereof, which relates to improvement of combustion conditions such as low oxygen combustion and circulation of the exhaust gas, and technologies for efficiently removing nitrogen monoxide.

However, unlike other air pollutants, nitrogen oxides are inevitably generated during a combustion process at high temperatures and are very stable compounds. Therefore, since it is impossible to sufficiently remove nitrogen oxides only by improving combustion technologies, post-treatment technologies that treat exhaust gases in various ways are drawing attention.

The post-treatment technologies are broadly divided into a selective catalytic reduction (SCR) technology using a catalyst and a selective non-catalytic reduction (SNCR) technology that performs treatment without using a catalyst. The selective catalytic reduction is a process that uses a reaction to reduce nitrogen oxides in exhaust gas into nitrogen by supplying a reducing agent such as urea or ammonia in the presence of a catalyst, and the selective non-catalytic reduction is a process that uses the above-described reaction in the absence of a catalyst.

The selective catalytic reduction is divided into a method of using a reducing agent and a method of performing direct decomposition over a catalyst without using a reducing agent. The direct decomposition method using the catalyst is the best way to directly decompose nitrogen oxides in exhaust gas into nitrogen and oxygen over the catalyst, but the method requires a high reaction temperature and the catalyst activity is easily reduced. Accordingly, the method of removing nitrogen oxides using the reducing agent has been mainly studied.

Among the technologies using the reduction reaction, the technology using a catalyst may reduce air pollutants with low cost and high efficiency. Accordingly, in terms of economic and technical aspects, a process using selective catalytic reduction, which includes supplying ammonia to exhaust gas and selectively reacting the resultant gas with nitrogen oxides over a suitable catalyst to thus generate nitrogen and water, has formed the mainstream of post-treatment technology.

Usually, in the case of a catalyst for selective catalytic reduction, titania, alumina, silica, or zirconia is mainly used as a carrier. As catalyst components, metal oxides, zeolites, alkaline earth metals, and rare earths are used, and also oxides of vanadium, molybdenum, nickel, tungsten, iron, and copper are frequently used. In particular, vanadium pentoxide (V$_2$O$_5$) and titanium dioxide (TiO$_2$) types account for most of the commercially available flue gas DeNOx technologies.

The conventional catalyst for purifying exhaust gas using ammonia as a reducing agent has not only excellent selectivity to NO$_X$, but also has the advantage of promoting a reaction of nitrogen monoxide (NO) with ammonia in the presence of oxygen. Therefore, the conventional catalyst is known to be the most advantageous for reducing nitrogen oxides. However, such an ammonia-SCR catalyst has excellent activity in a high temperature region, but exhibits poor DeNOx efficiency due to low activation energy in a low temperature region. Accordingly, there is a drawback in that the exhaust gas must be reheated to a temperature at which the catalyst can become active, which consumes enormous energy.

Further, with respect to the removal of nitrogen oxides from the exhaust gas, when the concentration of the sulfur oxides that coexist therewith is not sufficiently reduced, the catalyst is poisoned by the sulfur oxides, which makes it difficult to stably maintain the sufficient catalytic performance over a long period of time. Accordingly, in terms of maintaining the catalytic performance, it is required to remove both nitrogen oxides and sulfur oxides from the exhaust gas.

Therefore, Korean Patent No. 1113380 discloses an ammonia SCR catalyst containing manganese, cerium, and zeolite for selective reduction of nitrogen oxides at low temperatures. Korean Patent Application Publication No. 2015-0129852 discloses a SCR catalyst including an octahedral molecular sieve containing cerium oxides and manganese oxides for selective reduction of nitrogen oxides at low temperatures.

However, the SCR catalysts not only cause the problem of resistance to sulfur dioxide (SO$_2$) or moisture (H$_2$O), but also cause the problem of generation of secondary pollutants such as generation of NO$_2$ and N$_2$O due to the oxidation reaction of NH$_3$ and NO, and also have the problem of requirement for the high content of expensive manganese (Mn). Accordingly, the SCR catalysts are difficult to be applied to practical use immediately.

PRIOR ART DOCUMENT

Patent Document (Patent Document 1) Korean Patent No. 1113380 (Publication date: 2009 Sep. 17)
(Patent Document 2) Korean Patent Application Publication No. 2015-0129852 (Publication date: 2015 Nov. 20)

SUMMARY OF THE DISCLOSURE

Accordingly, the present disclosure has been made keeping in mind the above problems occurring in the related art, and a main objective of the present disclosure is to provide a DeNOx catalyst for selective catalytic reduction, which accelerates the reduction reaction of nitrogen oxides even at low temperatures, improves sulfur poisoning resistance, does not cause secondary environmental pollution by treated gas, and has excellent abrasion resistance and strength, so that the removal efficiency of nitrogen oxides is not reduced even during long-term operation, and also provides a method of manufacturing the same.

In order to accomplish the above objective, an embodiment of the present disclosure provides a method of manufacturing a low-temperature DeNOx catalyst for selective catalytic reduction. The method includes (a) preparing a first precursor aqueous solution including a bismuth precursor and a cerium precursor, (b) performing continuous mixing and high-speed dispersion of a titanium precursor aqueous solution in the first precursor aqueous solution, thus achieving co-precipitation, (c) drying and heat treating a co-precipitate, (d) preparing a second precursor aqueous solution including a vanadium precursor and a tungsten precursor, (e) dispersing the second precursor aqueous solution in the heat-treated co-precipitate of step (c) using ultrasonic waves to perform supporting, and (f) drying and calcining a supported material of step (e).

In a preferred embodiment of the present disclosure, the first precursor aqueous solution may include 3 to 27 parts by weight of the bismuth precursor and 5 to 18 parts by weight of the cerium precursor based on 100 parts by weight of a titanium precursor.

In a preferred embodiment of the present disclosure, the second precursor aqueous solution may include 0.1 to 3 parts by weight of the vanadium precursor and 1 to 12 parts by weight of the tungsten precursor based on 100 parts by weight of a titanium precursor.

In a preferred embodiment of the present disclosure, the continuous mixing and high-speed dispersion of step (b) may be performed at a temperature of 20 to 200° C. and a rotation speed of 5,000 to 20,000 rpm under a pressure of 1 to 100 bar.

In a preferred embodiment of the present disclosure, the continuous mixing and high-speed dispersion of step (b) may be performed using a continuous- or batch-type homogenizer.

In a preferred embodiment of the present disclosure, the ultrasonic waves in step (e) may be applied at room temperature to 90° C. for 1 to 10 hours.

In a preferred embodiment of the present disclosure, the heat treating of step (c) may be performed at 300 to 900° C. for 1 to 25 hours.

In a preferred embodiment of the present disclosure, the calcining of step (f) may be performed at 500 to 1,500° C. for 1 to 25 hours.

Another embodiment of the present disclosure provides a low-temperature DeNOx catalyst for selective catalytic reduction manufactured using the above-described manufacturing method. The low-temperature DeNOx catalyst includes a catalyst carrier including titanium, and catalyst particles supported on the catalyst carrier and containing bismuth and cerium on surfaces of which vanadium and tungsten are dispersed.

In another preferred embodiment of the present disclosure, the low-temperature DeNOx catalyst for selective catalytic reduction may have a DeNOx efficiency of 80% or more at 150 to 200° C. in a DeNOx reduction of an exhaust gas containing 10 to 100 ppm of sulfur oxide.

A low-temperature DeNOx catalyst for selective catalytic reduction according to the present disclosure accelerates the reduction reaction of nitrogen oxides even at low temperatures despite the small amount of vanadium supported, improves sulfur poisoning resistance, does not cause secondary environmental pollution by treated gas, has excellent abrasion resistance and strength, so that the removal efficiency of nitrogen oxides is not reduced even during long-term operation, and is easy to manufacture, thus contributing to commercialization.

DESCRIPTION OF THE PREFERRED EMBODIMENTS

Unless otherwise defined, all technical and scientific terms used in the present specification have the same meaning as commonly understood by an expert skilled in the art to which the present disclosure belongs. In general, the nomenclature used in the present specification is well known and commonly used in the art.

Throughout the specification of the present application, when a certain part is said to "include" a certain component, it means that other components may be further included, rather than excluding other components, unless otherwise stated.

An aspect of the present disclosure relates to a method of manufacturing a low-temperature DeNOx catalyst for selective catalytic reduction. The method includes (a) preparing a first precursor aqueous solution including a bismuth precursor and a cerium precursor, (b) performing continuous mixing and high-speed dispersion of a titanium precursor aqueous solution in the first precursor aqueous solution, thus achieving co-precipitation, (c) drying and heat treating a co-precipitate, (d) preparing a second precursor aqueous solution including a vanadium precursor and a tungsten precursor, (e) dispersing the second precursor aqueous solution in the heat-treated co-precipitate of step (c) using ultrasonic waves to perform supporting, and (f) drying and calcining a supported material of step (e).

In a conventional method used to manufacture a conventional multicomponent-based metal oxide catalyst, a process of mixing two or more metal solutions whose co-precipitation pH is adjusted to cause precipitation is performed, thereby manufacturing the catalyst. For example, a metal precursor to be co-precipitated is dissolved in a solution whose pH is adjusted as necessary, thus being prepared. Subsequently, among the solutions in which the individual metal precursors are dissolved, any one solution is dropped onto another solution to perform co-precipitation. When the co-precipitation of the catalyst is performed in this way, mixing is performed at a component ratio different from the final target component ratio, and the concentration of the co-precipitation solution slowly approaches the final target concentration as the co-precipitation is performed. Therefore, with respect to the metal component ratio of the co-precipitation solution, imbalance and agglomeration occur, and due to this, the component ratio of the particles is not constant in the co-precipitation step where the basic structure is formed, resulting in a reduction in activity.

Therefore, in the present disclosure, liquid-liquid contact between the first precursor aqueous solution and the titanium precursor is promoted through the continuous mixing and high-speed dispersion, and a constant metal component ratio is continuously maintained while the co-precipitation is performed, thus obtaining a co-precipitate having a constant metal component ratio that is maintained from the initial stage of the co-precipitation reaction to the end of the co-precipitation reaction. The second precursor aqueous solution is then mixed with the obtained co-precipitate, and the metal component of the second precursor is supported on the co-precipitate using an ultrasonic wave, so that the individual metal precursors are arranged and aligned according to the ultrasonic energy, whereby the metal components are more uniformly dispersed on the co-precipitate without aggregation, thereby manufacturing a catalyst that accelerates the reduction reaction of nitrogen oxides even at low temperatures despite the small amount of metal supported, improves sulfur poisoning resistance, and does not reduce the removal efficiency of nitrogen oxides even during long-term operation.

In the above-described method of manufacturing the low-temperature DeNOx catalyst for selective catalytic reduction according to the present disclosure, first, the first precursor aqueous solution including the bismuth precursor and the cerium precursor is prepared [step (a)].

In the first precursor aqueous solution, the bismuth precursor and the cerium precursor are dissolved in desalted water. With respect to the content of the desalted water, any content at which the bismuth precursor and the cerium precursor are capable of being sufficiently dissolved may be used without any limitations. However, preferably, 0.1 to 40 parts by weight of each precursor may be dissolved based on 100 parts by weight of the desalted water.

The cerium precursor serves as a cocatalyst, and any cerium precursor that is commonly used in the field of manufacturing a DeNOx catalyst may be used without limitation. Preferably, cerium nitrate [$Ce(NO_3)_3$], cerium acetate [$Ce(CH_3CO_2)_3$], cerium oxalate [$Ce_2(C_2O_4)_3$] or cerium oxide ($CeO_2$) may be used.

The cerium precursor may be contained in a content of 5 to 18 parts by weight, preferably 8 to 12 parts by weight, based on 100 parts by weight of a titanium precursor, which will be described later. When the content of the cerium precursor is less than 5 parts by weight, dispersibility may be increased, but the storage quality of oxygen in the lattice may be reduced due to the insufficient cerium content. When the content thereof is more than parts by weight, aggregation of particles may occur on the surface of the catalyst, resulting in a problem in that the activity thereof is reduced. As the content thereof is increased, it may be difficult to mold the catalyst.

Further, the bismuth precursor is added to improve the low-temperature reactivity and sulfur poisoning resistance in the catalyst, and to increase the reactivity between vanadium, tungsten, and titanium, which will be described later. The bismuth precursor may be bismuth nitrate [$Bi(NO_3)_2$] or bismuth hydrochloride [$Bi(SO_4)_3$]. The bismuth precursor may be contained in a content of 3 to 27 parts by weight, preferably 5 to 20 parts by weight, based on 100 parts by weight of a titanium precursor, which will be described later.

When the content of the cerium precursor is less than 3 parts by weight, since the amount of the active material in the catalyst is insufficient, a problem of low activity may occur. When the content thereof is more than 27 parts by weight, aggregation of particles may occur on the surface of the catalyst, resulting in a problem in that the activity thereof is reduced. As the content thereof is increased, the stability of catalyst molding may be deteriorated.

Subsequently, the first precursor aqueous solution containing the cerium precursor and the bismuth precursor is continuously mixed with the titanium precursor aqueous solution and is dispersed at a high speed therein, thus achieving co-precipitation [step (b)].

In the titanium precursor aqueous solution, a titanium precursor is dissolved in desalted water. With respect to the content of the desalted water, any content at which the titanium precursor is capable of being sufficiently dissolved may be used without any limitations. However, preferably, 0.1 to 40 parts by weight of the titanium precursor may be dissolved based on 100 parts by weight of the desalted water.

The titanium precursor may be titanium dioxide ($TiO_2$) or amorphous titanic acid, which acts as a support for components used as a main catalyst and a cocatalyst due to a high specific surface area thereof and also increases the physical strength of the catalyst or improves the heat resistance, thereby increasing the life of the catalyst.

The continuous mixing and high-speed dispersion may be performed at a temperature of 20 to 200° C. or 50 to 100° C. and a rotation speed of 5,000 to 20,000 rpm under a pressure of 1 to 100 bar, 1 to 50 bar, or 1 to 20 bar. It is possible to achieve the uniform component ratio and uniform dispersion of the present disclosure within the above-described range.

The continuous mixing and high-speed dispersion may be performed using an in-line homogenizer. For example, the first precursor aqueous solution and the titanium precursor aqueous solution may be added to the in-line homogenizer under the condition of an hourly input amount in which the total amount input time of the first precursor aqueous solution and the total amount input time of the titanium precursor aqueous solution are the same as each other, whereby continuous addition is possible, the mixing ratio is constant, and the high-speed dispersion is possible. The in-line homogenizer may be a continuous- or batch-type homogenizer.

In the case of using the homogenizer, the internal temperature, internal pressure, and rotation speed conditions that are the same as the above-described conditions (a temperature of 20 to 200° C. or 50 to 100° C., a pressure of 1 to 100 bar, 1 to 50 bar, or 1 to 20 bar, and a rotation speed of 5,000 to 20,000 rpm) may be applied. When the homogenizer is used, the residence time may be, for example, 0.0001 seconds to 5 hours or 0.01 seconds to 2 hours.

As described above, the co-precipitate, in which the cerium precursor, the bismuth precursor, and the titanium precursor are co-precipitated using the continuous mixing and high-speed dispersion, is dried using a typical method and apparatus, and then heat treated [step (c)].

When the drying temperature is very low or the drying time is very short, since perfect drying is not performed, the catalyst may contain moisture in the fine pores thereof, resulting in a decrease in activity. When the drying temperature is very high or the drying time is very long, the activity of the catalyst may be reduced due to a sintering phenomenon. Accordingly, the co-precipitate may be dried at room temperature to 120° C. for 5 to 50 hours.

Further, the dried co-precipitate is heat treated in order to control the size and dispersibility of active components. When the heat treatment condition includes a temperature of less than 300° C. or a time of less than 1 hour, the material used as the precursor is not properly removed. When the temperature is more than 900° C. or the time is more than 25 hours, since the physical properties of the catalytically active material and the material used as the support of the catalyst are changed, durability or a specific surface area may be reduced, resulting in a decrease in removal efficiency of nitrogen oxides.

The heat treatment may be performed in a variety of known furnaces such as a tube furnace, a convection furnace, and a grate furnace, without particular limitation thereto.

Subsequently, the second precursor aqueous solution including the vanadium precursor and the tungsten precursor is prepared [step (d)].

In the second precursor aqueous solution, the vanadium precursor and the tungsten precursor are dissolved in desalted water. With respect to the content of the desalted water, any content at which the vanadium precursor and the tungsten precursor are capable of being sufficiently dissolved may be used without any limitations. However, preferably, 0.1 to 40 parts by weight of each precursor may be dissolved based on 100 parts by weight of the desalted water.

The vanadium precursor is a catalytically active component, and any vanadium precursor that is commonly used in the field of manufacturing a DeNOx catalyst may be used without limitation. Preferably, ammonium metavanadate ($NH_4VO_3$), vanadium oxytrichloride ($VOCl_3$), and vanadium oxide ($V_2O_3$) may be used, and it is more preferable to use ammonium metavanadate ($NH_4VO_3$).

The ammonium metavanadate ($NH_4VO_3$) is more environmentally friendly than other types of catalysts, and becomes vanadium pentoxide ($V_2O_5$) when the ammonium metavanadate is thermally decomposed. Vanadium pentoxide acts as a catalyst for reducing nitrogen oxides in exhaust gas, has excellent resistance to sulfur oxides, and acts as a catalyst for oxidizing sulfur dioxide ($SO_2$) to sulfur trioxide ($SO_3$), so that sulfur trioxide is combined with steam in exhaust gas and thus converted into sulfuric acid ($H_2SO_4$), thereby ensuring an effect of removing sulfur dioxide from the exhaust gas.

When the ammonium metavanadate is used as the vanadium precursor, since the solubility of ammonium metavanadate is very small, it is preferable to mix the oxalic acid with the ammonium metavanadate aqueous solution while stirring little by little in order to increase the solubility.

The vanadium precursor may be contained in a content of 0.1 to 3 parts by weight, preferably 0.5 to 2 parts by weight, based on 100 parts by weight of the titanium precursor. When the content of the vanadium precursor is less than 0.1 parts by weight, the effect of removing nitrogen oxides may be insufficient. When the content is more than 3 parts by weight, aggregation of the powder may occur due to the high content thereof, and the efficiency with respect to the increase in the content may not be satisfactory, which is not preferable in terms of economy and environment.

Meanwhile, the tungsten precursor is a catalytically active component, and any compound that is commonly used in the field of manufacturing a DeNOx catalyst for selective catalytic reduction may be used without limitation. Preferably, ammonium metatungstate [$(NH_4)_6W_{12}O_{39}$], ammonium paratungstate [$(NH_4)_{10}W_{12}O_{41}$] ammonium tungstate ($H_8N_2O_4W$), ammonium tungstate sulfide ($H_8N_2S_4W$), and tungsten oxide ($WO_3$) may be used.

The tungsten precursor may be contained in a content of 1 to 12 parts by weight, preferably 5 to 10 parts by weight, based on 100 parts by weight of the titanium precursor. When the content of the tungsten precursor is less than 1 part by weight, structural stabilization of titanium oxide may be insufficient, or catalyst efficiency may be poor in a wide range of temperatures, particularly at high temperatures. When the content is more than 12 parts by weight, aggregation of the powder may occur due to the high content thereof, and the efficiency with respect to the increase in the content may not be satisfactory, which is not preferable in terms of economy and environment.

Vanadium of the vanadium precursor and tungsten of the tungsten precursor are transition metals, and the number of electrons occupying the internal electron orbit is incomplete, so that the electrons are easily lost to form a cation state. Accordingly, the vanadium and the tungsten form a compound together with the titanium precursor, thus activating the selective catalytic reduction of the catalyst and improving impact resistance, heat resistance, and corrosion resistance. Further, the vanadium and the tungsten are easily reacted with oxygen to form an oxide passivation protective film, so oxidization hardly occurs and stability against alkali, sulfuric acid, and hydrochloric acid is ensured.

The second precursor aqueous solution is dispersed in the heat-treated co-precipitate described above using an ultrasonic wave, thus performing supporting [step (e)].

In the supporting using the ultrasonic wave, the ultrasonic waves are applied to the second precursor aqueous solution mixed with the heat-treated co-precipitate, so that the individual metal salts are arranged and aligned according to the ultrasonic energy, whereby the metal salts are more uniformly dispersed on the co-precipitate. The environment for applying the ultrasonic waves may be appropriately adjusted depending on the volume of the aqueous solution to be manufactured and the concentrations of the metal salts.

The supporting using the ultrasonic waves may be performed at room temperature to 90° C. for 1 to 10 hours. When the supporting is performed at a temperature of less than normal temperature (20° C.) or for a time of less than 1 hour, precipitation may be insufficiently performed, and vanadium and tungsten, which are catalytically active materials, may not be sufficiently dispersed on the surface of the co-precipitate, thus reducing the activity. When the supporting is performed at a temperature of more than 90° C. or for a time of more than 10 hours, aggregation may occur due to the growth of particles at high temperatures over a long period of time, resulting in a reduction of activity.

The condition of the ultrasonic waves includes an intensity of 75 to 400 w, preferably 100 to 200 w, and a frequency of 5,000 to 30,000 times/second, preferably 10,000 to 15,000 times/second. When the intensity and/or frequency of the ultrasonic waves is less than the lower limit, it is impossible to uniformly disperse the metal salts. When the intensity and/or frequency is more than the upper limit, since the catalyst is damaged, it is impossible to obtain the desired catalyst.

Subsequently, the supported material that is dispersed and supported using the ultrasonic waves is dried and calcined, thus manufacturing a low-temperature DeNox catalyst for selective catalytic reduction [step (e)].

When the drying temperature is very low or the drying time is very short, since perfect drying is not performed, the catalyst may contain moisture in the fine pores thereof, resulting in a decrease in activity. When the drying temperature is very high or the drying time is very long, the activity of the catalyst may be reduced due to a sintering phenomenon. Accordingly, the supported material may be dried at room temperature (20° C.) to 100° C. for 2 to 24 hours.

The dried supported material is subjected to calcining in order to control the size and dispersibility of active components through heat treatment, thus manufacturing the low-temperature Dell catalyst for selective catalytic reduction. The calcining may be performed at 500 to 1,500° C. for 1 to 25 hours.

When the calcining condition includes a temperature of less than 500° C. or a time of less than 1 hour, the material used as the precursor may not be properly removed, and particles and pores of the DeNOx catalyst for selective catalytic reduction may be unevenly distributed, resulting in a decrease in removal efficiency of nitrogen oxides. When the temperature is more than 1,500° C. or the time is more than 25 hours, since the physical properties of the catalytically active material and the material used as the support of the catalyst are changed, durability may be reduced, or the removal efficiency of nitrogen oxides may be reduced.

The calcining process may be performed in a variety of known furnaces such as a tube furnace, a convection furnace, and a grate furnace, without particular limitation thereto.

In the low-temperature DeNOx catalyst for selective catalytic reduction manufactured as described above, bismuth and cerium, on surfaces of which vanadium and tungsten are uniformly dispersed as catalytically active materials, are supported on titanium which is a catalyst support. Accordingly, even in the exhaust gas containing sulfur oxides, the activity of removing nitrogen oxides at low temperatures may be stably maintained.

Another aspect of the present disclosure relates to a low-temperature DeNOx catalyst for selective catalytic reduction manufactured using the above-described manufacturing method. The low-temperature DeNOx catalyst includes a catalyst carrier including titanium, and catalyst particles supported on the catalyst carrier and containing bismuth and cerium on surfaces of which vanadium and tungsten are dispersed.

In the low-temperature DeNOx catalyst for selective catalytic reduction according to the present disclosure, bismuth and cerium, on surfaces of which vanadium and tungsten are uniformly dispersed at a predetermined ratio as catalytically active materials, may be supported on the catalyst carrier containing titanium without aggregation of catalyst particles, thereby exhibiting a DeNOx efficiency of 80% or more at 150 to 200° C. in the DeNOx reduction reaction of the exhaust gas containing sulfur oxides. The exhaust gas may include 10 to 100 ppm of sulfur oxides.

Further, the low-temperature DeNOx catalyst for selective catalytic reduction according to the present disclosure may be manufactured and used in the form of structures such as metal plates, metal fibers, ceramic filters, and honeycombs, in particle or monolith forms extruded together with a small amount of binder, or in various forms such as slates, plates, and pellets.

Hereinafter, the present disclosure will be described in more detail through specific Examples. The following Examples are only examples to aid understanding of the present disclosure, and the scope of the present disclosure is not limited thereto.

Example 1

10 g of $Ce(NO_3)_3$ and 10 g of $Bi(NO_3)_2$ were mixed with 100 g of distilled water to prepare a first precursor aqueous solution, and 100 g of $TiO_2$ was mixed with 1,000 g of distilled water to prepare a titanium precursor aqueous solution. After the prepared first precursor aqueous solution and titanium precursor aqueous solution were each added to a separate inlet of an in-line continuous homogenizer (UTL 25 digital in-line homogenizer, products manufactured by IKA company), the first precursor aqueous solution was supplied at a rate of 8.18 g/min, and at the same time, the titanium precursor aqueous solution was supplied at a rate of 13.30 g/min. The homogenizer was rotated at 15,000 rpm while holding for 1 second under a pressure of 1 bar. The co-precipitate obtained from the outlet of the in-line continuous homogenizer (UTL 25 in-line homogenizer, IKA) was stored in a mixed state in a double-jacketed reactor controlled at 50° C. After the stored co-precipitate was stirred for 60 minutes using a magnetic stirrer, the precipitated solution was dried at 90° C. for 5 hours, and the dried co-precipitate was heat treated at 600° C. for 10 hours, thus obtaining a solid sample. 1.0 g of $H_4VO_3$ and 6.0 g of $(NH_4)_{10}W_{12}O_{41}$ were mixed with 100 g of distilled water to prepare a second precursor aqueous solution. The heat-treated solid sample was supported in the prepared second precursor aqueous solution at room temperature for 2 hours using an ultrasonic wave. The ultrasonic waves were applied under a condition of the intensity of 120 w and the frequency of 12,000 times/seconds. Subsequently, the supported material subjected to mixing using the ultrasonic waves was filtered using centrifugation, washed with desalted water, dried using a rotary vacuum evaporator at 80° C. for 20 hours, and calcined at 900° C. for 3 hours, thus manufacturing a low-temperature DeNox catalyst for selective catalytic reduction.

Examples 2 to 5 and Comparative Examples 1 to 7

A low-temperature DeNOx catalyst for selective catalytic reduction was manufactured using the same manufacturing method as in Example 1, except that the contents of Table 1 were adopted.

Comparative Example 8

A low-temperature DeNOx catalyst for selective catalytic reduction was manufactured using the same manufacturing method as in Example 1, except that an in-line continuous homogenizer was not used, a first precursor aqueous solution and a titanium precursor aqueous solution were mixed and co-precipitated to obtain a solid sample, and the obtained solid sample was mixed with and precipitated in a second precursor aqueous solution without an ultrasonic-wave process.

TABLE 1

| Classification | Titanium precursor (g) | Bismuth precursor (g) | Cerium precursor (g) | Vanadium precursor (g) | Tungsten precursor (g) |
| --- | --- | --- | --- | --- | --- |
| Example 1 | 100 | 10.0 | 10.0 | 0.10 | 5.00 |
| Example 2 | 100 | 3.00 | 10.0 | 0.10 | 5.00 |
| Example 3 | 100 | 25.0 | 10.0 | 0.10 | 5.00 |
| Example 4 | 100 | 10.0 | 5.00 | 0.10 | 5.00 |
| Example 5 | 100 | 10.0 | 15.0 | 0.10 | 5.00 |
| Comparative Example 1 | 100 | — | 10.0 | 0.10 | 5.00 |
| Comparative Example 2 | 100 | 10.0 | — | 0.10 | 5.00 |
| Comparative Example 3 | 100 | 10.0 | 10.0 | 0.10 | — |

TABLE 1-continued

| Classification | Titanium precursor (g) | Bismuth precursor (g) | Cerium precursor (g) | Vanadium precursor (g) | Tungsten precursor (g) |
|---|---|---|---|---|---|
| Comparative Example 4 | 100 | 1.00 | 10.0 | 0.10 | 5.00 |
| Comparative Example 5 | 100 | 30.0 | 10.0 | 0.10 | 5.00 |
| Comparative Example 6 | 100 | 10.0 | 1.00 | 0.10 | 5.00 |
| Comparative Example 7 | 100 | 10.0 | 25.0 | 0.10 | 5.00 |

Experimental Example 1: Measurement of DeNOx Performance of Low-Temperature DeNOx Catalyst for Selective Catalytic Reduction A NOx-conversion-reaction experimental apparatus included a catalyst reaction unit in which a catalyst was mounted and a reaction occurred, a heater for controlling the temperature of the catalyst reaction unit, a pre-heater for preheating the injected gas, a temperature control panel and an MFC (mass flow controller) for controlling the temperature and the amount of injected gas, and a water pump. The reaction temperature of a reactor was adjusted in the range of 100 to 300° C., and a powdery catalyst was prepared as the catalyst to be analyzed. The catalysts manufactured in Examples 1 to 5 and Comparative Examples 1 to 8 were classified so as to have only an average particle size of 200 pun using grinding and sieving and then applied. With respect to the volume of the catalyst, a space velocity (SV) was calculated to be 60,000 ml/gh, based on the criteria specified in the VGB guideline, which has been used as a standard for performance evaluation of DeNOx catalysts in Europe, Japan, and the United States since 2005. Further, the gas supplied to the reactor was allowed to flow at a total flow rate of 500 sccm based on the criteria specified in the VGB guideline. NO gas (1% mol/mol) was allowed to quantitatively flow in an amount of 500 ppm (v/v), and $NH_3$ gas and $SO_2$ gas were allowed to flow in an amount of 500 ppm (v/v) and 100 ppm (v/v), respectively. The concentration of $O_2$ (1% mol/mol) was maintained at 5% (v/v), and the total flow rate was maintained using $N_2$ (high purity liquefied nitrogen). In order to perform an accurate activity experiment, a reaction experiment was performed after stabilization was performed for a predetermined period of time under the corresponding reaction conditions, and the reaction gas except 02 was analyzed using a CLD (chemi-luminescence detector, T200H, Teledyne). The 02 gas was analyzed using an 02 analyzer (DSM-XG, DONG WOO OPT). After a change in concentration of $NO_x$ at the gas outlet passing through the gas inlet and the catalyst reaction unit was measured using analysis equipment, the removal efficiency of $NO_x$ was calculated using the following Equation 1, and the result is shown in Table 2.

NOx conversion (%)=100×[(inlet NOx concentration−outlet NOx concentration)/inlet NOx concentration]   [Equation 1]

TABLE 2

| Classification | NOx conversion for each reaction temperature (%) | | | | |
|---|---|---|---|---|---|
| | 100° C. | 150° C. | 200° C. | 250° C. | 300° C. |
| Example 1 | 81 | 92 | 94 | 88 | 86 |
| Example 2 | 64 | 81 | 84 | 89 | 92 |
| Example 3 | 79 | 89 | 91 | 86 | 84 |
| Example 4 | 73 | 80 | 86 | 88 | 90 |
| Example 5 | 76 | 81 | 85 | 87 | 93 |
| Comparative Example 1 | 33 | 39 | 48 | 67 | 71 |
| Comparative Example 2 | 61 | 70 | 75 | 74 | 75 |
| Comparative Example 3 | 52 | 69 | 71 | 65 | 72 |
| Comparative Example 4 | 39 | 44 | 59 | 67 | 69 |
| Comparative Example 5 | 69 | 71 | 72 | 69 | 66 |
| Comparative Example 6 | 61 | 73 | 77 | 76 | 79 |
| Comparative Example 7 | 49 | 62 | 78 | 82 | 85 |
| Comparative Example 8 | 17 | 32 | 42 | 55 | 57 |

As shown in Table 2, the catalysts of Examples 1 to 5 have the DeNOx performance and sulfur poisoning resistance superior to those of Comparative Examples 1 to 8 in a temperature range of 150 to 200° C. In particular, the catalyst of Example 1 is far superior in DeNOx performance and sulfur poisoning resistance compared to other catalysts.

Therefore, it can be confirmed that the low-temperature DeNOx catalyst for selective catalytic reduction according to the present disclosure accelerates the reduction reaction of nitrogen oxides even at low temperatures despite the small amount of vanadium supported and improves sulfur poisoning resistance.

As described above, specific parts of the present disclosure have been described in detail, but it will be apparent to those of ordinary skill in the art that these specific descriptions are merely preferred embodiments and the scope of the present disclosure is not limited thereto. Therefore, it will be said that the substantial scope of the present disclosure is defined by the appended claims and their equivalents.

What is claimed is:

1. A method of manufacturing a low-temperature DeNOx catalyst for selective catalytic reduction, comprising:
    (a) preparing a first precursor aqueous solution including a bismuth precursor and a cerium precursor;
    (b) performing continuous mixing and high-speed dispersion of a titanium precursor aqueous solution in the first precursor aqueous solution to form a co-precipitate;
    (c) drying and heat-treating the co-precipitate to form a heat-treated co-precipitate;
    (d) preparing a second precursor aqueous solution including a vanadium precursor and a tungsten precursor;
    (e) dispersing the second precursor aqueous solution in the heat-treated co-precipitate using ultrasonic waves to perform supporting to form a supported material; and
    (f) drying and calcining the supported material.

2. The method of claim 1, wherein the first precursor aqueous solution includes 3 to 27 parts by weight of the bismuth precursor and 5 to 18 parts by weight of the cerium precursor based on 100 parts by weight of a titanium precursor.

3. The method of claim 1, wherein the second precursor aqueous solution includes 0.1 to 3 parts by weight of the vanadium precursor and 1 to 12 parts by weight of the tungsten precursor based on 100 parts by weight of a titanium precursor.

4. The method of claim 1, wherein the continuous mixing and high-speed dispersion of step (b) are performed at a temperature of 20 to 200° C. and a rotation speed of 5,000 to 20,000 rpm under a pressure of 1 to 100 bar.

5. The method of claim 1, wherein the continuous mixing and high-speed dispersion of step (b) are performed using a continuous- or batch-type homogenizer.

6. The method of claim 1, wherein the ultrasonic waves in step (e) are applied at room temperature to 90° C. for 1 to 10 hours.

7. The method of claim 1, wherein the heat treating of step (c) is performed at 300 to 900° C. for 1 to 25 hours.

8. The method of claim 1, wherein the calcining of step (f) is performed at 500 to 1,500° C. for 1 to 25 hours.

* * * * *